United States Patent
Ohara et al.

(10) Patent No.: US 6,887,036 B2
(45) Date of Patent: May 3, 2005

(54) TURBINE AND MANUFACTURING METHOD THEREFOR

(75) Inventors: Minoru Ohara, Takasago (JP); Nobuhiro Kunitake, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 234 days.

(21) Appl. No.: 10/290,206

(22) Filed: Nov. 8, 2002

(65) Prior Publication Data

US 2003/0132119 A1 Jul. 17, 2003

(30) Foreign Application Priority Data

Nov. 9, 2001 (JP) .................................... P2001-344904

(51) Int. Cl.$^7$ ................................................ F01D 5/20
(52) U.S. Cl. .................................. 415/173.4; 415/174.4
(58) Field of Search ........................... 415/173.4, 174.4; 416/241 B; 277/415, 416

(56) References Cited

U.S. PATENT DOCUMENTS

| | | | |
|---|---|---|---|
| 4,227,703 A | * 10/1980 | Stalker et al. | ............... 277/415 |
| 4,744,725 A | 5/1988 | Matarese et al. | |
| 5,264,011 A | 11/1993 | Brown et al. | |
| 5,702,574 A | 12/1997 | Foster et al. | |
| 5,935,407 A | 8/1999 | Nenov et al. | |
| 5,997,248 A | * 12/1999 | Ghasripoor et al. | ..... 415/173.4 |

FOREIGN PATENT DOCUMENTS

| | | |
|---|---|---|
| EP | 0 443 877 A1 | 8/1991 |
| JP | 61-19351 | 1/1986 |
| JP | 63-212703 | 9/1988 |
| JP | 4-285198 | 10/1992 |
| JP | 8-71926 | 3/1996 |
| JP | 10-30403 | 2/1998 |
| JP | 10-100070 | 4/1998 |
| JP | 2000-345809 | 12/2000 |
| WO | WO 95/12004 | 5/1995 |
| WO | WO 02/068716 | 9/2002 |
| WO | WO 02/068799 | 9/2002 |
| WO | WO 02/097160 | 12/2002 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

A tip of rotor blade which rotates is an abradable surface. An inner wall of a shroud as a jacket for the rotor blade is an abrasive surface. A part of an abrasive particle protrudes from the abradable surface. When the tip of the rotor blade which rotates contacts the inner wall of the shroud, the protruding section of the abrasive particle slides with the abrasive surface so as to be ground. By doing this, a turbine which can maintain an appropriate clearance between the rotor blade and the shroud and can be used for a long period under high-temperature conditions with easy restoration and remaking thereof.

5 Claims, 5 Drawing Sheets

BY BRAZING FILLER METHOD

BY THERMAL SPRAYING METHOD

TURBINE AND MANUFACTURING METHOD THEREFOR

BACKGROUND OF THE INVENTION

1. Field of the Invention

The present invention relates to a turbine which can maintain an appropriate clearance between an rotor blade and a shroud during an operation thereof.

2. Description of Related Art

In FIG. 4, an example of a turbine which is used for a gas turbine or a jet engine is known. A turbine 100 comprises a rotor 110 having a plurality of rotor blade unit 111 which are disposed along a rotating shaft X—X intermittently and a cone-shaped shroud 120 as a jacket for the rotor blade unit 111. Reference numeral 121 indicates a stator blade which extends from an inner wall of the shroud 120 so as to be disposed between the rotor blade unit 111. A high-pressure-fluid is introduced in to a turbine 100 from a smaller diameter region of the shroud 120, the rotor 110 rotates due to a force which is generated at screw surfaces of the rotor blade unit 111; thus, it is possible to convert kinetic energy of the fluid into a rotational force. In the turbine 100, a clearance is formed between tips of the rotor blade unit 111 and an inner wall of the shroud 120 facing the tips of the rotor blade unit 111 so as to prevent contact by both of them. If this clearance is too large, the fluid leaks from a higher-pressure region to a lower-pressure region of the rotor blade unit 111; thus pressure-loss occurs and operational efficiency decreases. Therefore, it is necessary to minimize the clearance so as to restrict the leak of the high-pressure-fluid and increase the efficiency of the turbine operation. This applies to a case of a turbine which converts a rotational force into fluid pressure.

On the other hand, if the clearance is too small, the tips of the rotor blade unit and the inner wall of the shroud 120 contact in an initial phase of the turbine operation due to factors such as thermal expansion of the rotor blade unit 111, centrifugal force on the rotor 110, and vibrations of the overall turbine 100. Because of this, the tips of the of the rotor blade unit and the inner wall of the shroud 120 slide against each other when the rotor blade unit rotate. Such a phenomena is commonly called an "initial slide". Also, if a turbine is operated for longer periods, the rotor blade unit 111 and the shroud 120 are exposed to a high-temperature-high-pressure fluid and thermal expansion occurs. In such a case, it sometimes happens that the tips of the rotor blade unit 111 and the inner wall of the shroud 120 contact and slide. Such a phenomena is commonly called a "secondary slide".

Commonly, for example, for purposes of heat protection and oxidization, a protecting layer is formed on a shroud and a rotor blade. For the purpose of heat protection, a thermal barrier coating (hereinafter called TBC) made from a zirconium oxide ceramic member is used. Also, for the purpose of oxidization protection, a layer of MCrAlY (M is at least one of Fe, Ni, CoNi, NiCo, and Co) is used. Also, MCrAlY can be CrAlY (in this case, M is nothing). However, hardness of the TBC as the outermost layer is high. Therefore, when the tips of the rotor blade unit 111 and the inner wall of the shroud 120 contact and slide, there is serious damage, particularly to the rotor blade, due to friction heat and sliding stress. In order to solve such a problem, in Japanese Unexamined Patent Application, First Publication No. Hei 4-218698, Japanese Re-Publication of PCT International Publication for Patent Applications No. Hei 9-504340, and U.S. Pat. No. 5,702,574, a gas turbine in which an abrasive layer 112 is formed in a matrix having MCrAlY at a tip of the rotor blade unit 111 is disclosed. FIG. 5A shows an example of such a turbine. In this example, an abrasive particle such as CBN (Cubic Boron Nitride) particle 113 is dispersed in the matrix. In this example of the turbine, the CBN particles 113 protrude.

When the abrasive layer 112 is provided on the tip of the rotor blade unit 111, the tip of the CBN particles 113 which protrude from the abrasive layer 112 grinds the inner wall 123 of the shroud so as to form a groove 124 even if the tip of the rotor blade unit 111 and the inner wall 123 of the shroud 120 slide against each other when the rotor blade unit 111 rotates. This is because hardness of the CBN particle 113 is higher than the hardness of the protecting layer 122 (for example, zirconium oxide ceramic member) of the shroud 120 as shown in FIG. 5B. By doing this, it is possible to obtain an appropriate clearance. Also, in Japanese Unexamined Patent Application, First Publication No. 2000-345809, a gas turbine engine having an abrasive coating which is made by embedding particles such as CBN on the inner wall of the shroud and by protruding it and an abradable coating which is supposed to be ground by the above-mentioned particle and formed on the tip of the rotor blade. In such a case, particles which are disposed on the inner wall of the shroud grinds the abradable coating which is disposed on the tip of the rotor blade unit when the rotor blade unit rotates; thus, it is possible to obtain the clearance. As explained above, in conventional suggestions for attempts to obtain the clearance by a grinding-operation by using rotation of the rotor blade unit, clearance was formed by forming an abrasive surface which is formed by embedding a hard particle such as CBN to either one of the tip of the rotor blade unit or an inner wall of the shroud and an abradable surface to the other, and grinding the abradable surface by the particles on the abrasive surface. However, by such a technique, it was necessary to restore or remake the abradable surface when the turbine is examined for maintenance purposes because the abradable surface is deeply ground because of the initial slide and the secondary slide during the operation of the turbine. For restoring such abradable surfaces, huge appliances such as a blasting apparatus, a thermal spraying apparatus, and a high temperature heating furnace were necessary. Therefore, it was difficult to restore or remake the abradable surfaces at a manufacturing site where the turbine is located. From this point of view, a turbine which can realize the restoration and remaking of the abradable surface easily has been required. Also, when a gas turbine in which a CBN particle is used on the abrasive surface is actually operated, the grinding performance decreases in a temperature over 900° C. due to factors such as deterioration of the CBN particle because of oxidization. It was also found that, when the turbine is operated further, overall CBN particles disappear and the abrasive surface and the abradable surface slide on each other directly. In this case, the abradable surface made from the ceramic member is harder than a matrix layer of the abrasive surface made from MCrAlY. Therefore, it was also found that the abradable surface also grinds the abrasive surface. Furthermore, it was pointed out that the rotor blade unit is possibly exposed and sticks to the abradable surface. The grinding performance of the CBN particle decreases rapidly under high-temperature conditions because it is estimated that the CBN repeatedly oxidizes and sublimites under high-temperature conditions. Therefore, durability is a problem if a gas turbine and a jet engine are operated for longer periods under high-temperature conditions. Therefore, it is thought that a conventional turbine using a CBN particle for forming a clearance is only useful during a period of an initial slide.

Also, as shown in FIG. 5B, if a groove 124 is formed on an abradable surface 123, the clearance becomes too large in an initial phase after the turbine is restarted. In such a case, there is a possibility that the pressure loss which is caused by fluid leak cannot be ignored. Also, if the protecting layer 122 as an abradable surface is made from zirconium oxide ceramic member, huge apparatuses and different restoring techniques were necessary to restore or remake the groove 124 because it was necessary to form an intermediate layer on a base material by a thermal spraying method and further form a zirconium oxide ceramic layer in a uniform thickness. Such operations could not be performed in a site where the turbine was located.

SUMMARY OF THE INVENTION

The present invention was made in consideration of the above-explained problems. An object of the present invention is to provide a turbine in which appropriate clearance can be always maintained between the rotor blade unit and the shroud and which can operate for longer periods under high-temperature conditions. Also, another object of the present invention is to provide a manufacturing method for a turbine which does not require a huge apparatus to manufacture, restore, and remake it.

In order to solve the above-mentioned problems, the present invention provides a turbine, in which either one of a tip of a rotating rotor blade unit or an inner wall of a shroud as a jacket for a rotor blade unit has an abrasive surface and the other one has an abradable surface, in which a part of abrasive particle of the abradable surface protrudes; and a protruding part of the abrasive particle slides on the abrasive surface and the protruding part of the abrasive particle is worn away when the tip of the rotating rotor blade unit contacts the inner wall of the shroud.

The turbine according to the present invention is different form a conventional turbine in which a particle which protrudes from an abrasive surface grinds an abradable surface so as to obtain a clearance. The turbine according to the present invention obtains a clearance when the protruding part of the abrasive particle which protrudes from the abradable is ground when it slides on the abrasive surface. Thus, the turbine according to the present invention does not grind the abradable surface by an abrasive particle which protrudes from the abrasive surface. Therefore, there is no defect such as a groove on the abradable surface. Therefore, the turbine according to the present invention can always maintain a minimum required clearance during its operation.

Also, the turbine according to the present invention has a long fatigue life, and it is easy to restore and remake the turbine because only the abradable surface on which a part of abrasive particles are protruded must be restored.

In the present invention, the abrasive particle should preferably be alumina particles ($Al_2O_3$) or silicon carbide particles (SiC). Typically, the Vickers hardness of the alumina particle or Vickers hardness of silicon carbide particle are higher than that of the TBC on a facing surface made from zirconium oxide ceramic member or the oxidization layer such as MCrAlY. Nevertheless, it was found that the alumina particle or silicon carbide particle was ground when they slide on the TBC and the oxidization layer. Although the reason was not clear, it is believed that these particles are relatively fragile. That is, the tip of the abrasive particle is ground by abrasive stress which occurs when these surfaces slide against each other. Consequently, the rest of the abrasive particles which were not ground form a clearance between the tip of the rotor blade unit and the inner wall of the shroud.

In the present invention, sliding friction is less than that of the abrasive coating using an ordinary CBN particle because the abrasive particle is ground. Thus, there are many advantages because there is no cohesion, no accumulation, and no invasion of ground waste of abrasive particles.

In the present invention, it is preferable that diameter of the abrasive particle be in a range of 500 μm to 1500 μm.

It is preferable that diameter of the abrasive particle be in a range of 500 μm to 1500 μm so that the tip of the abrasive particle is ground to some degree by sliding with the facing surface and the rest of the protruding part of the abrasive particle forms the minimum required clearance between the tip of the rotor blade unit and the inner wall of the shroud. If a diameter of the abrasive particle is less than 500 μm, this is not preferable because the rest of the protruding part which was not ground in the initial sliding does not maintain a sufficient height for forming a minimum required clearance in the secondary sliding. If the diameter of the abrasive particle exceeds 1500 μm, the height of the protruding part forms more than the required height of clearance after the grinding operation. Also, the density of the abrasive particles on the abradable surface inevitably decreases. Therefore, a diameter of the abrasive particles over 1500 μm is not preferable because flowing friction of the fluid which passes the clearance decreases, and pressure loss caused by the fluid leak increases; thus, operational efficiency decreases. From this point of view, it is further preferable that the diameter of the abrasive particles be in a range of 800 to 1000 μm.

In the present invention, it is preferable that a height of the protruding part of the abrasive particle from the abradable surface be in a range of 30% to 70% of the diameter of the abrasive particle.

The abrasive particles are fixed on the abradable surface by embedding a part of the particle into the abradable surface. Therefore, it is necessary to embed the abrasive particle into the abradable surface to some degree of depth in order to prevent the abrasive particle from falling off therefrom during sliding on the abrasive surface. From this point of view, it is preferable that a height of the protruding part of the abrasive particle from the abradable surface be in a range of 30% to 70% of the diameter of the abrasive particle. It is further preferable that a height of the protruding part of the abrasive particle from the abradable surface be in a range of 40% to 50% of the diameter of the abrasive particle and the rest of the protruding part be embedded in the abradable surface.

In the present invention, it is preferable that the rest of the protruding part of the abrasive particle which is worn away by sliding with the abrasive surface form a clearance between the tip of the rotor blade unit and the inner wall of the shroud.

That is, in a turbine according to the present invention, the tip of the abrasive particle which protrudes from the abradable surface is ground when the abrasive particle slides with the abrasive surface; therefore, the rest of the protruding part of the abrasive particle forms a clearance. The present invention includes a turbine in which the tip of the abrasive particle is ground and the rest of the protruding part forms a clearance. There is a possibility that the protruding part of the abrasive particle is ground in the initial sliding and in the secondary sliding. Also, the clearance changes according to whether the slide phase is initial or secondary. However, unless the protruding part of the abrasive particle disappears completely, the minimum required clearance can be always maintained.

The present invention provides a manufacturing method for a turbine in which either one of a tip of a rotating rotor blade unit or an inner wall of a shroud as a jacket for a rotor blade unit has an abrasive surface and the other one has an abradable surface and a part of the abrasive particle protrudes from the abradable surface, the abradable layer containing the abrasive particle and a matrix member for fixing the abrasive particle is formed on a surface of a base which forms the abradable surface; and a blast processing is performed on the abradable layer so as to form the abradable surface in which a part of the abrasive particle protrudes.

According to manufacturing method for a turbine, the abrasive particle is protruded from the abradable surface by a blasting-process. Therefore, huge apparatuses, such as a chemical etching machine are not necessary, and only small apparatuses are needed in the present invention. Therefore, it is possible to restore or remake the abradable surface relatively easily at a site where the turbine is located. The abrasive particles are disposed horizontally in random and in multiple layers. Therefore, it is possible to expose the particles only by protruding thereon after restarting the turbine operation. Thus, it is easy to restore the abradable surface.

Also, surface unity between the abrasive particle and the matrix member which can be observed in the chemical etching operation is not deteriorated. Therefore, the present invention can prevent the abrasive particle from falling off.

It is preferable that the abrasive particle be alumina particle ($Al_2O_3$) or silicon carbide particle (SiC). Also, it is preferable that the diameter of the abrasive particle be in a range of 500 μm to 1500 μm.

In the present invention, it is preferred that manufacturing method for a turbine have steps for forming the abradable layer for forming a layered substrate containing a brazing filler layer of which ingredient is a brazing filler and a matrix layer in which at least a part of the matrix layer is eutectic with the brazing filler and an abrasive particle and a volatile binder on a surface of a base which forms an abradable surface, heating the base for evaporating the volatile binder from the layered substrate, and melting the brazing filler so as to infiltrating the brazing filler into the matrix layer.

If two layers containing a brazing filler and a matrix layer is formed on a surface of the base member and is heated, volatile binder evaporates, the brazing filler melts, and the melt brazing filler invades the matrix layer so as to be eutectic with the matrix member particle. If two layers containing a brazing filler and a matrix layer is formed on a surface of the base member and cooled, an abradable layer which unites with the base member and the abrasive particle strongly is formed. The volatile binder fixes the abrasive particle and the matrix particle temporarily until the brazing filler which is melted by heating-operation invades the matrix layer. The volatile binder disappears because it evaporates by this heating-operation. According to this method, the abradable layer can only be formed by adhering the layered substrate on a surface of the base member and heating it. Also, it is possible to form a layer mainly made from the MCrAlY on plated abrasive particle by a thermal spraying method.

In the present invention, it is preferred that zirconium oxide particle ($ZrO_2$) be used for a blasting member.

For a blasting member, substances which can avoid damaging the abrasive particle and can grind the matrix member efficiently are preferable. According to examination of blasting-members such as alumina particle, glass beads, and NiCr, it was found that zirconium oxide is preferable. Also, the rest of the particles among the above-mentioned particles can be used for blasting-operation according to conditions. As far as the diameter of zirconium oxide particles is concerned, a range of 40 μm to 50 μm was particularly preferable.

In the present invention, an abrasive particle protrudes from an abradable layer by a range of 30% to 70% of the diameter of the abrasive particle in a blasting-operation.

By doing this, the unity between the abrasive particle and the matrix layer can be maintained tightly, and it is possible to prevent the abrasive particle from falling off during the blasting-process or turbine operation.

In the turbine according to the present invention, either one of a tip of a rotating rotor blade unit or an inner wall of a shroud as a jacket for a rotor blade unit has an abrasive surface and the other one has an abradable surface. Also, a part of the abrasive particle which is supposed to be ground by the abrasive surface protrudes from the abradable surface. Therefore, the clearance can be obtained because the protruding section of the abrasive particle is ground when the rotor blade unit rotates and the tip of the rotor blade unit slides on the inner wall of the shroud. By doing this, it is possible to realize a turbine in which the inner wall of the shroud and the rotor blade unit unit are not damaged. Also, it is possible to realize a turbine in which the minimum required clearance is always maintained in the initial slide phase or in the secondary slide phase. Also, it is possible to realize a turbine which is easily restored and remade.

DETAILED DESCRIPTION OF THE INVENTION

Figure 1:
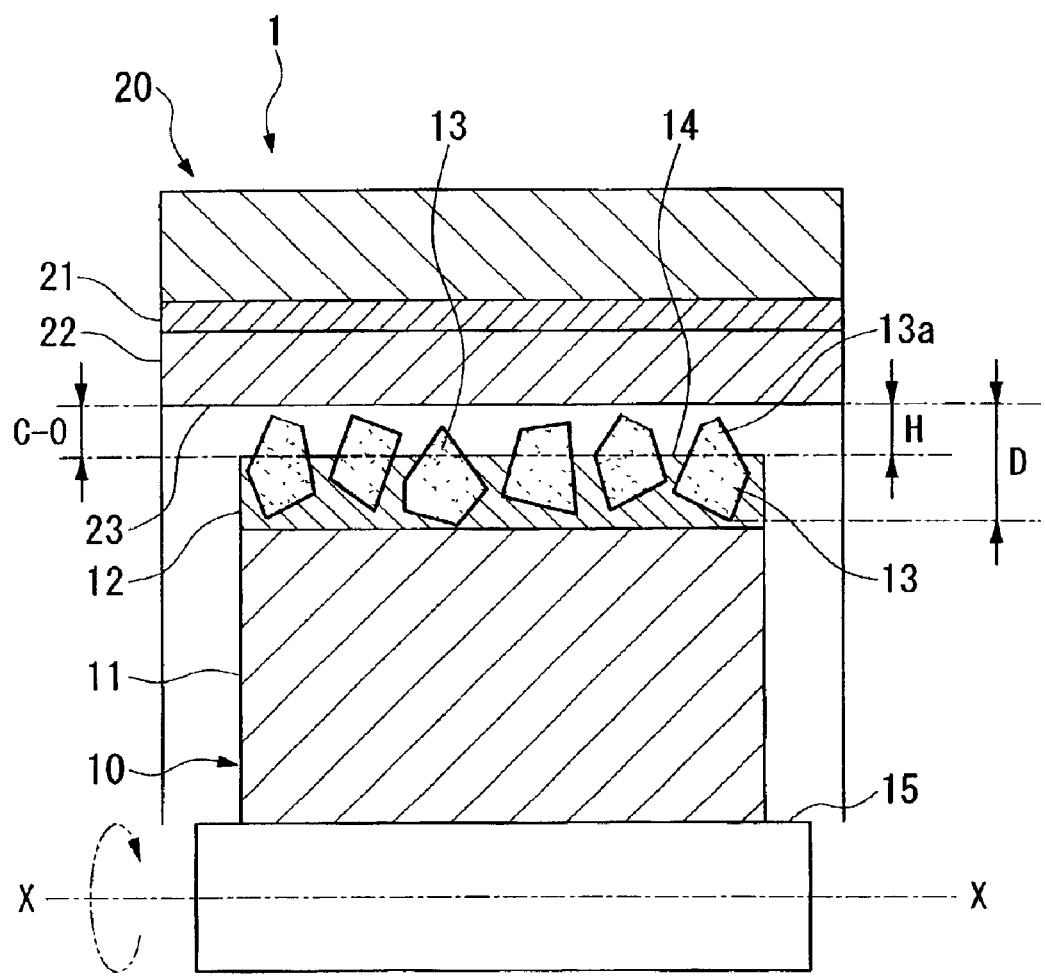
FIG. 1 is across section showing an embodiment of the turbine according to the present invention.

The invention disclosed herein may be variously modified and be in alternative forms. Specific embodiments therefor have been shown by way of example in the drawings and detailed description. It should be understood, however, that the drawings and detailed description thereof are not intended to limit the invention to the particular form disclosed, but on the contrary, the invention is to cover all modifications, equivalents and alternatives falling within the scope of the present invention as defined by the claims.

FIG. 1 is a cross section of a turbine according to an embodiment of the present invention. In FIG. 1, a turbine 1 comprises a rotor 10 and a shroud 20.

The rotor 10 comprises a shaft 15 which extends along a rotational axis X—X, a rotor blade unit 11 which extends from the shaft 15 radially, and an abradable layer 12 which is formed on the tip of the rotor blade unit 11. Numerous abrasive particles 13 are fixed on the abradable layer 12. Parts of abrasive particles 13 protrude from the abradable surface 14 as a surface of the abradable layer 12 so as to form a protruding section 13a. The rotor blade unit 11 has a screw shape along the rotational axis X—X. This screw shape is not shown in the drawing.

A shroud 20 is a jacket which surrounds the rotor 10 in an axial manner with the shaft 15. On an inner wall of the shroud 20, a TCB 22 is formed having an intermediate layer 21 between the inner wall of the shroud and the TCB 22. The surface of the TCB 22 acts as an abrasive surface 23. Accordingly, a clearance C-0 is formed between the abrasive surface 23 and the abradable surface 14 of the rotor blade unit.

The abrasive particle 13 is made from alumina particle ($Al_2O_3$) Diameter of the abrasive particle 13 is in a range of 800 $\mu$m to 1000 $\mu$m. Height H of the protruding section 13a of the abrasive particle 13 is mostly in a range of 30% to 70% of the diameter D of the abrasive particle 13.

The abradable layer 12 is an anti-oxidization coating which is mainly made from MCrAlY alloy. This point is explained in detail later. The abradable layer 12 is united with the rotor blade unit 11 and the abrasive particle 13 very tightly.

The TCB 22 which is formed on the shroud 20 is a ceramic member which is stabilized by adding a stabilizing agent such as MgO or $Y_2O_3$ to $ZrO_2$. Thickness of the TCB 22 is almost in a range of 300 $\mu$m to 1000 $\mu$m. The intermediate layer 21 is formed by performing a plasma-thermal-spraying process of the MCrAlY alloy (M is at least one of Fe, Ni, CoNi, NiCo, and Co) into the shroud. Also, MCrAlY can be CrAlY (in this case, M is nothing).

Figure 2:
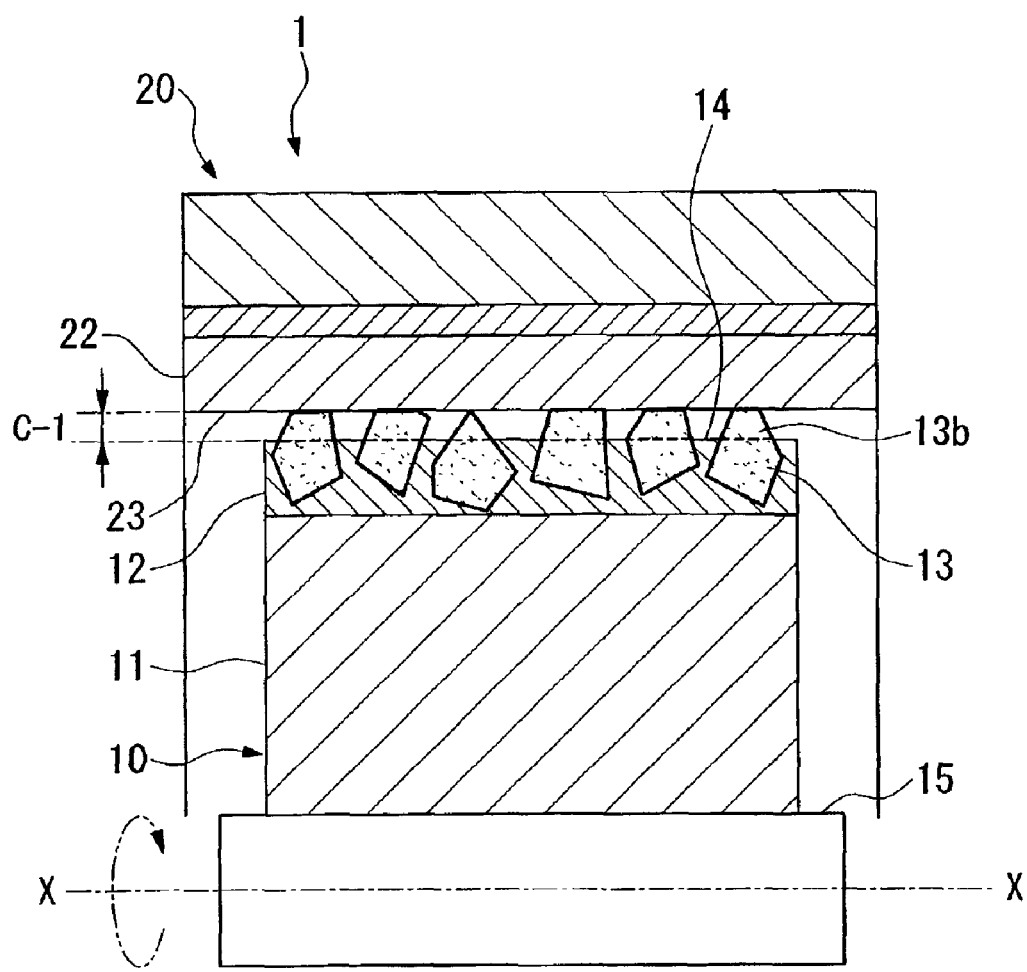
FIG. 2 is a cross section showing an operational condition of the turbine.

The turbine 1 has a screw shape on its rotor blade unit 11; therefore, the rotor 10 begins rotating in one direction around a rotational axis X—X when a high-pressure-high-temperature fluid is introduced from an opening section of the shroud 20. When the rotor 10 begins rotating, condition of the clearance which is disposed between the abrasive surface 23 and the abradable surface 14 changes according to factors such as thermal expansion of the rotor blade unit 11, centrifugal force on the rotor 10, and vibrations which occur in the entire turbine 1. For example, when the length of the rotor blade unit 11 increases due to thermal expansion, the clearance becomes smaller than it initial length C-0 and becomes smaller than a height H of the protruding section 13a of the abrasive particle. When the rotor blade unit 11 is under such conditions in the initial phase of the rotation, the tip of the protruding section 13a slides on the abrasive surface 23 and is ground until the sliding friction becomes almost zero as shown in FIG. 2. As a result, the clearance changes to a smaller value such as C-1 than the initial length C-0. The clearance C-1 can be maintained by the rest of the protruding section 13b of the abrasive particle 13; therefore, the rotor blade unit and the shroud do not contact unless conditions change, for example, by the increase of temperature. Accordingly, the tip of the rotor blade unit and the inner wall of the shroud are not ground nor cohered to each other.

When the turbine 1 is operated for a long period such as 1000 hours, thermal transformation occasionally occurs gradually on the rotor blade unit 11 and the shroud 20 because rotor blade unit 11 and the shroud 20 are exposed to the high-temperature-high-pressure fluid. Also a stress which further narrows the clearance C-1 partially is generated occasionally. In such a case, the rest of the tip of the protruding section 13b of the abrasive particle 13 slides on the abrasive surface 23 of the shroud secondarily so as to be ground again. As a result of this, the clearance becomes further narrower than that of C-1. However, the rotor blade unit and the shroud do not contact by setting the rotor blade unit and the shroud such that the protruding section of the abrasive particle 13 does not become zero. Therefore, the tip of the rotor blade unit and the inner wall of the shroud are not ground nor cohered to each other. Even if the height of the protruding section becomes zero, it was confirmed that the cohesion of the rotor blade unit and the shroud are hardly cohered to each other because the ratio of the abrasive particles on the contacting surface is large.

Diameter D of the abrasive particle 13 is in a range of 800 $\mu$m to 1000 $\mu$m. Also, the height of the protruding section 13a is in a range of 30% to 70% of the diameter of the abrasive particle; thus, initial clearance C-0 is sufficiently large. Therefore, it is possible to compensate for abrasion which is caused by the initial sliding and the secondary sliding. Also, the rest of the protruding section can obtain an appropriate clearance. Also, the fluid does not pass because of the protrusion of the large diameter abrasive particle 13; therefore, there is less pressure loss and no operational efficiency loss even if the initial clearance C-0 is large.

The rotor blade unit of the present embodiment can be manufactured by the following manufacturing method.

Figure 3A:
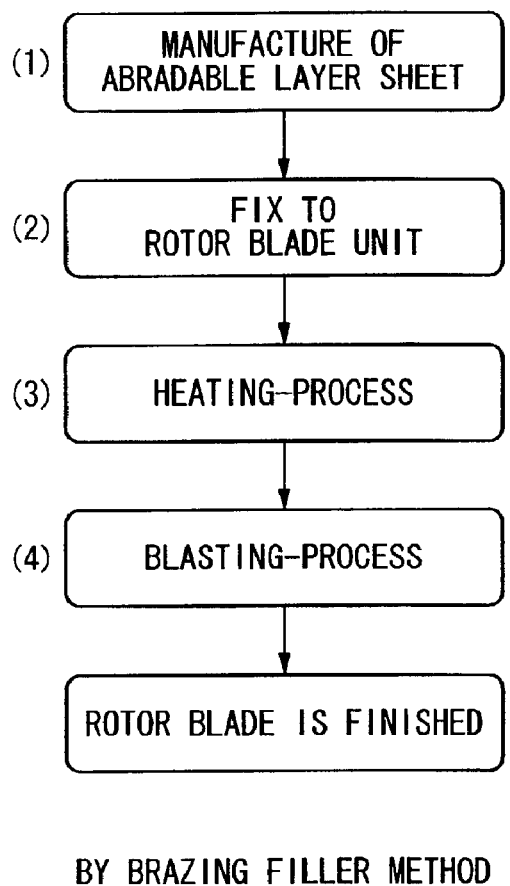
FIGS. 3A and 3B are flow charts of manufacturing process of the rotor blade unit of the turbine.
Figure 3B:
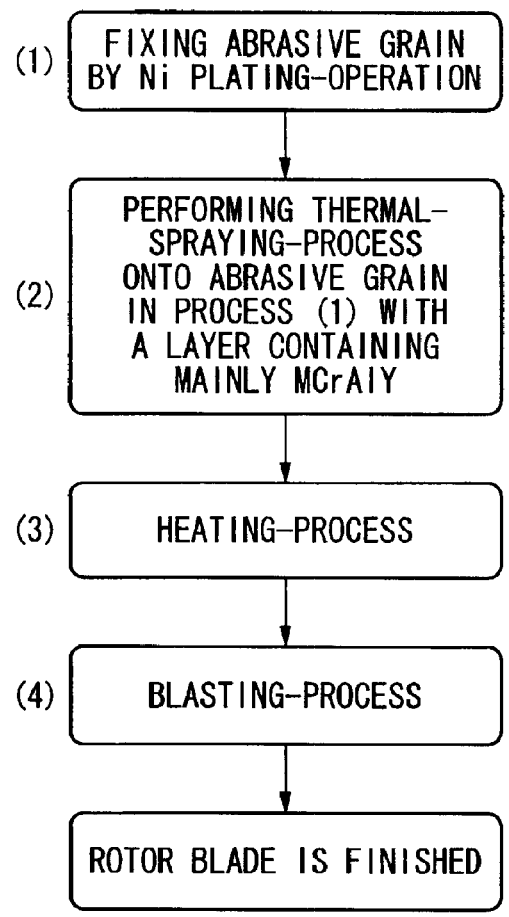
Figure 4:
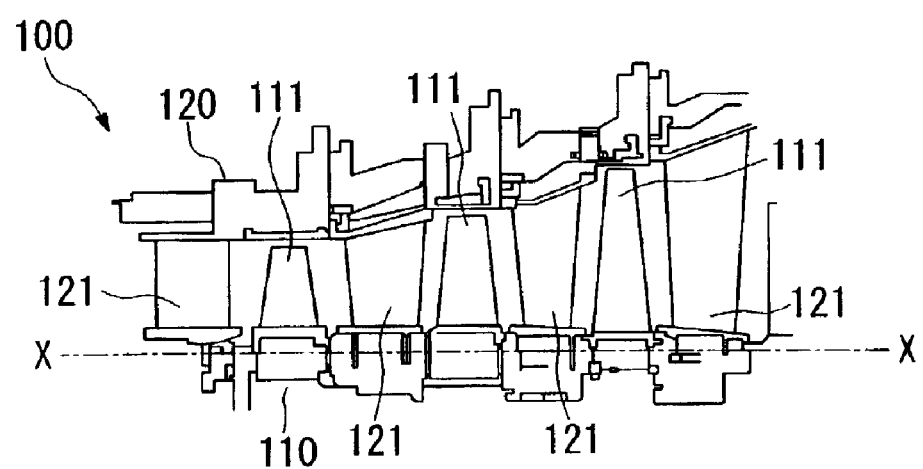
FIG. 4 is a cross section of a turbine which is commonly known.
Figure 5A:
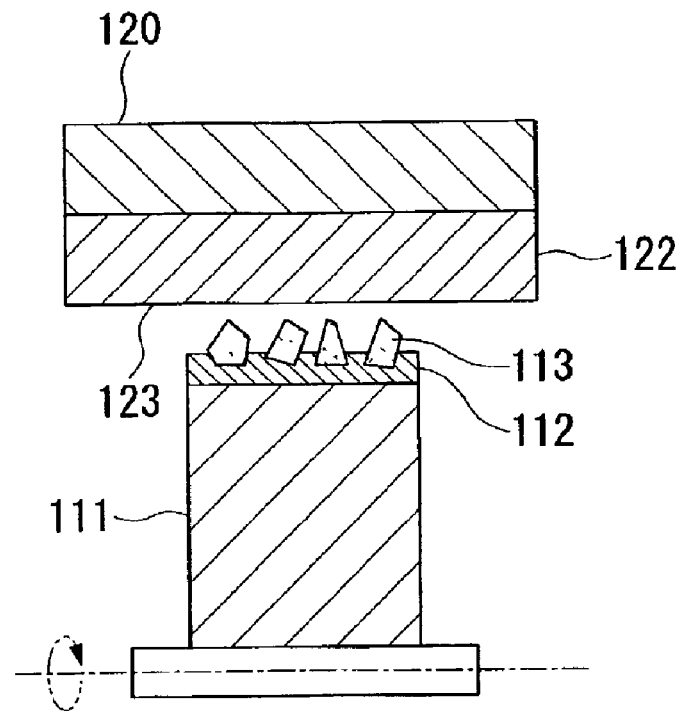
FIG. 5A is a cross section of a part of a conventional turbine.
Figure 5B:
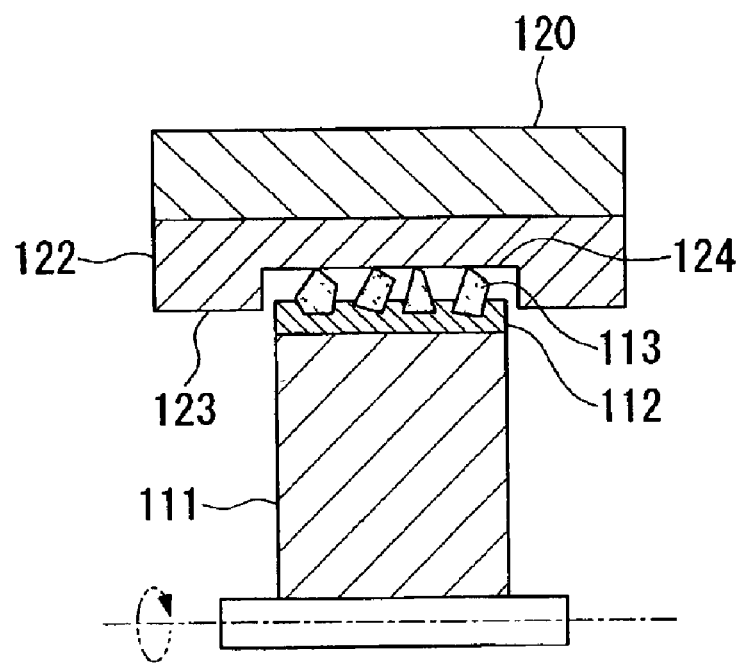
FIG. 5B shows an operational condition of the conventional turbine.

FIGS. 3A and 3B are flowcharts showing a manufacturing process of the rotor blade. According to flow chart 3A, an abradable layer sheet is made as a preparatory process (1).

Next, the abradable layer sheet is cohered to the rotor blade unit (2). In a process (3), the abradable sheet is heated together with the rotor blade unit so as to form an abradable layer on the rotor blade unit. In a process (4), a blasting-operation is performed on the abradable layer so as to protrude the abrasive particle. Thus, a rotor blade unit is manufactured.

Also, according to the flow chart shown in FIG. 3B, in a process (1), nickel-plating-operation is performed on the abrasive particle so as to be fixed. Consequently, as a process (2), a thermally-sprayed-coating having MCrAlY as a main ingredient is formed on the abrasive particle. As a process (3), heating-operation is performed on the thermal-spray-coating. As a process (4), the rotor blade unit is finished by performing a thermal-spray-process including a blasting operation.

In FIG. 1, the TCB 22 which forms an inner wall of the shroud 20 is made from a ceramic member which is made by adding a stabilizer such as MgO or $Y_2O_3$ to $ZrO_2$. The stabilized ceramic member is formed by performing a plasma-thermal spraying process such that the intermediate layer 21 having a thickness in a range of 300 μm to 1000 μm is formed on the inner wall of the shroud to which MCrAlY alloy (M is at least one of Fe, Ni, CoNi, NiCo, and Co) is thermally sprayed. Also, MCrAlY can be CrAlY (in this case, M is nothing)

In the present embodiment, the inner wall of the shroud is the abrasive surface 23, and an abradable surface 14 is formed on the tip of the rotor blade unit. It is certainly acceptable for the inner wall of the shroud to be an abradable surface and the tip of the rotor blade unit to be an abrasive surface. Also, a turbine in the present embodiment was explained as a gas turbine. However, it is certain that the present invention can be applied to any turbine structures which have a problem in fluctuating clearance between the rotor blade unit and the shroud.

What is claimed is:

1. A turbine comprising:
   rotor blades which rotate; and
   a shroud as a jacket for the rotor blades, wherein
   either one of a tip of a rotating rotor blade or an inner wall of a shroud has an abrasive surface and the other one has an abradable surface;
   a part of an abrasive particle of the abradable surface protrudes; and
   a protruding part of the abrasive particle slides on the abrasive surface and the protruding part of the abrasive particle is worn away when the tip of the rotating rotor blade contacts the inner wall of the shroud.

2. A turbine according to claim 1 wherein the abrasive particle is an alumina particle ($Al_2O_3$) or a silicon carbide particle (SiC).

3. A turbine according to claim 2 wherein the diameter of the abrasive particle is in a range of 500 μm to 1500 μm.

4. A turbine according to claim 3 wherein a height of the protruding part of the abrasive particle from the abradable surface is in a range of 30% to 70% of the diameter of the abrasive particle.

5. A turbine according to claim 4 wherein a remainder of the protruding part of the abrasive particle which is worn away by sliding on the abrasive surface forms a clearance between the tip of the rotor blade and the inner wall of the shroud.

* * * * *

UNITED STATES PATENT AND TRADEMARK OFFICE
CERTIFICATE OF CORRECTION

PATENT NO. : 6,887,036 B2
APPLICATION NO. : 10/290206
DATED : May 3, 2005
INVENTOR(S) : Minoru Ohara et al.

It is certified that error appears in the above-identified patent and that said Letters Patent is hereby corrected as shown below:

Column 2, line 11, change "abrasive particle" to --abradable particle--.
Column 3, line 43, change "abrasive particle" to --abradable particle--;
line 44, change "abrasive particle" to --abradable particle--;
line 45, change "abrasive particle" to --abradable particle--;
line 53, change "abrasive particle" to --abradable particle--;
line 56, change "abrasive particle" to --abradable particle--.
Column 4, line 4, change "abrasive particle" to --abradable particle--;
line 5, change "abrasive particle" to --abradable particle--;
line 15, change "abrasive particle" to --abradable particle--;
line 17, change "abrasive particle" to --abradable particle--;
line 23, change "abrasive particle" to --abradable particle--;
line 25, change "abrasive particle" to --abradable particle--;
line 28, change "abrasive particle" to --abradable particle--;
line 29, change "abrasive particle" to --abradable particle--;
line 31, change "abrasive particle" to --abradable particle--;
line 34, change "abrasive particle" to --abradable particle--;
line 38, change "abrasive particle" to --abradable particle--;
line 41, change "abrasive particle" to --abradable particle--;
line 43, change "abrasive particle" to --abradable particle--;
line 50, change "abrasive particle" to --abradable particle--;
line 52, change "abrasive particle" to --abradable particle--;
line 55, change "abrasive particle" to --abradable particle--;
line 57, change "abrasive particle" to --abradable particle--;
line 60, change "abrasive particle" to --abradable particle--.

UNITED STATES PATENT AND TRADEMARK OFFICE
CERTIFICATE OF CORRECTION

PATENT NO. : 6,887,036 B2
APPLICATION NO. : 10/290206
DATED : May 3, 2005
INVENTOR(S) : Minoru Ohara et al.

It is certified that error appears in the above-identified patent and that said Letters Patent is hereby corrected as shown below:

Column 5, line 1, change "abrasive particle" to --abradable particle--;
line 3, change "abrasive particle" to --abradable particle--;
line 4, change "abrasive particle" to --abradable particle--;
line 8, change "abrasive particle" to --abradable particle--;
line 13, change "abrasive particle" to --abradable particle--;
line 14, change "abrasive particle" to --abradable particle--;
line 16, change "abrasive particle" to --abradable particle--;
line 17, change "abrasive particle" to --abradable particle--;
line 20, change "abrasive particle" to --abradable particle--;
line 23, change "abrasive particle" to --abradable particle--;
line 30, change "abrasive particle" to --abradable particle--;
line 32, change "abrasive particle" to --abradable particle--;
line 33, change "abrasive particle" to --abradable particle--;
line 36, change "abrasive particle" to --abradable particle--;
line 38, change "abrasive particle" to --abradable particle--;
line 44, change "abrasive particle" to --abradable particle--;
line 49, change "abrasive particle" to --abradable particle--;
line 52, change "abrasive particle" to --abradable particle--;
line 53, change "abrasive particle" to --abradable particle--;
line 55, change "abrasive particle" to --abradable particle--.
Column 6, line 2, change "abrasive particle" to --abradable particle--;
line 14, change "abrasive particle" to --abradable particle--;
line 15, change "abrasive particle" to --abradable particle--;
line 23, change "abrasive particle" to --abradable particle--;
line 28, change "abrasive particle" to --abradable particle--;
line 37, change "abrasive particle" to --abradable particle--;
line 39, change "abrasive particle" to --abradable particle--;
line 40, change "abrasive particle" to --abradable particle--;
line 42, change "abrasive particle" to --abradable particle--;
line 48, change "abrasive particle" to --abradable particle--;
line 51, change "abrasive particle" to --abradable particle--.
Column 7, line 30, change "abrasive particle" to --abradable particle--;
line 31, change "abrasive particle" to --abradable particle--;
line 44, change "abrasive particle" to --abradable particle--;
line 45, change "abrasive particle" to --abradable particle--;
line 47, change "abrasive particle" to --abradable particle--;
line 48, change "abrasive particle" to --abradable particle--;
line 52, change "abrasive particle" to --abradable particle--.

UNITED STATES PATENT AND TRADEMARK OFFICE
CERTIFICATE OF CORRECTION

PATENT NO. : 6,887,036 B2
APPLICATION NO. : 10/290206
DATED : May 3, 2005
INVENTOR(S) : Minoru Ohara et al.

It is certified that error appears in the above-identified patent and that said Letters Patent is hereby corrected as shown below:

Column 8, line 14, change "abrasive particle" to --abradable particle--;
line 21, change "abrasive particle" to --abradable particle--;
line 33, change "abrasive particle" to --abradable particle--;
line 39, change "abrasive particle" to --abradable particle--;
line 44, change "abrasive particle" to --abradable particle--.
line 46, change "abrasive particle" to --abradable particle--;
line 49, change "abrasive particle" to --abradable particle--;
line 54, change "abrasive particle" to --abradable particle--.
Column 9, line 6, change "abrasive particle" to --abradable particle--;
line 10, change "abrasive particle" to --abradable particle--;
line 12, change "abrasive particle" to --abradable particle--.
Column 10, line 12, change "abrasive particle" to --abradable particle--;
line 15, change "abrasive particle" to --abradable particle--;
line 18, change "abrasive particle" to --abradable particle--;
line 22, change "abrasive particle" to --abradable particle--;
line 24, change "abrasive particle" to --abradable particle--;
line 26, change "abrasive particle" to --abradable particle--;
line 28, change "abrasive particle" to --abradable particle--.

Signed and Sealed this

Ninth Day of December, 2008

JON W. DUDAS
*Director of the United States Patent and Trademark Office*